United States Patent
El-Gawady et al.

(10) Patent No.: US 10,574,769 B2
(45) Date of Patent: Feb. 25, 2020

(54) INTERNET PROTOCOL MULTIMEDIA SUBSYSTEM CONNECTION MANAGEMENT

(71) Applicant: Verizon Patent and Licensing Inc., Arlington, VA (US)

(72) Inventors: Sameh El-Gawady, Waltham, MA (US); Jason A. Coglon, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 161 days.

(21) Appl. No.: 15/713,132

(22) Filed: Sep. 22, 2017

(65) Prior Publication Data

US 2019/0098103 A1   Mar. 28, 2019

(51) Int. Cl.
   *G06F 15/16* (2006.01)
   *H04L 29/08* (2006.01)
   *H04L 29/06* (2006.01)

(52) U.S. Cl.
   CPC .......... *H04L 67/26* (2013.01); *H04L 65/1006* (2013.01); *H04L 65/1016* (2013.01); *H04L 65/1073* (2013.01); *H04L 67/141* (2013.01); *H04L 67/303* (2013.01); *H04L 67/20* (2013.01); *H04L 67/2809* (2013.01)

(58) Field of Classification Search
   CPC .......................... H04L 65/1016; H04L 65/1073
   See application file for complete search history.

(56) References Cited

U.S. PATENT DOCUMENTS

| | | | | |
|---|---|---|---|---|
| 8,499,082 B2* | 7/2013 | Roach | ............. | H04M 7/123 370/259 |
| 9,628,971 B2* | 4/2017 | Salvador | ............. | H04W 88/08 |
| 2004/0057442 A1* | 3/2004 | Westman | ............. | H04L 12/5692 370/401 |
| 2006/0111134 A1* | 5/2006 | Mills | ............. | H04W 76/45 455/518 |
| 2007/0298794 A1* | 12/2007 | Cho | ............. | H04W 60/00 455/435.1 |
| 2009/0088162 A1* | 4/2009 | Zhao | ............. | H04W 36/005 455/436 |
| 2009/0191869 A1* | 7/2009 | Siegel | ............. | H04W 8/02 455/435.1 |
| 2010/0138484 A1* | 6/2010 | Lee | ............. | H04L 65/1089 709/203 |
| 2012/0258712 A1* | 10/2012 | Rozinov | ............. | H04L 61/1535 455/435.1 |
| 2015/0121123 A1* | 4/2015 | Bath | ............. | H04L 63/08 714/4.11 |
| 2015/0381820 A1* | 12/2015 | Ting | ............. | H04M 7/0075 370/259 |

(Continued)

*Primary Examiner* — Umar Cheema
*Assistant Examiner* — Tesfu N Mekonen

(57) ABSTRACT

A device can be configured to receive first internet protocol multimedia subsystem (IMS) data from a user device, provide the first IMS registration data to an IMS device, maintain—on behalf of the user device—an IMS connection between the user device and the IMS device. In addition, the device an receive, from the IMS device, an IMS invite addressed to the user device, temporarily hold the IMS invite, provide a push notification device with a push notification request specifying the user device, receive second IMS registration data from the user device, and perform an action based on the second IMS registration data.

20 Claims, 6 Drawing Sheets

(56) References Cited

U.S. PATENT DOCUMENTS

| | | | |
|---|---|---|---|
| 2016/0226937 A1* | 8/2016 | Patel | H04L 65/4061 |
| 2016/0277909 A1* | 9/2016 | Salvador | H04W 88/08 |
| 2017/0134444 A1* | 5/2017 | Buckley | H04L 65/1069 |
| 2018/0041550 A1* | 2/2018 | Mufti | H04L 65/1006 |

* cited by examiner

INTERNET PROTOCOL MULTIMEDIA SUBSYSTEM CONNECTION MANAGEMENT

BACKGROUND

The IP Multimedia Subsystem (IMS) is an architectural framework for delivering Internet Protocol (IP) multimedia services. Historically, mobile phones have provided voice call services over a circuit-switched-style network, rather than strictly over an IP packet-switched network. Alternative methods of delivering voice or other multimedia services over IP have become available on smartphones (e.g. VoIP applications), but they have not become standardized across the industry. The IMS is an architectural framework to provide such standardization.

DETAILED DESCRIPTION OF PREFERRED EMBODIMENTS

The following detailed description of example implementations refers to the accompanying drawings. The same reference numbers in different drawings may identify the same or similar elements.

For user devices that use applications that make use of an IMS, such as VoIP and video calling applications, multimedia communications sessions are established with a network provider that provides access to IMS services. To enable an application operating on a user device to receive IMS data (e.g., including IMS Invites, short message service (SMS) data, session initiation protocol (SIP) messages, NOTIFY messages, and/or the like), a network provider can use a session initiation protocol (SIP) proxy server (e.g., a device implementing a Proxy Call Session Control Function (P-CSCF), Session Border Controller (SBC), and/or the like) to receive IMS registration data from a user device and forward the IMS registration data to the IMS core. After registering with the IMS, a user device can maintain the IMS connection by periodically providing keep-alive data to the network provider, such as registration refreshing data and transport layer security (TLS) keep-alive data. The user device provides the keep-alive data to enable the user device to receive IMS communications, such as voice and video calls.

Maintaining the IMS session can cause the user device to use power which, in the case of mobile devices or other devices that are powered by batteries, can drain the battery of the user device. In addition, the data sent by a user device can have a cost, both for the user of the user device (e.g., data usage charges) and for the network provider (e.g., many user devices maintaining IMS sessions can increase network congestion and the number of resources allocated to handling IMS session maintenance).

Some implementations, described herein, provide an IMS call management device that is capable of maintaining an IMS connection on behalf of a user device that has dropped the IMS connection and storing an IMS invite addressed to the user device until the user device re-registers. Re-registration by the user device can be based on the user device receiving a push notification from a third party push notification network, where the third party push notification network provided the push notification based on a request sent by the IMS call management device. In this way, the user device can drop IMS connections that are not actively being used, conserving resources such as battery life, processing resources, and network bandwidth. In addition, the device can facilitate significant data processing and network usage savings for a network provider by obviating the use of keep-alive data transmissions by potentially, hundreds, thousands, or millions of user devices.

Figure 1A:
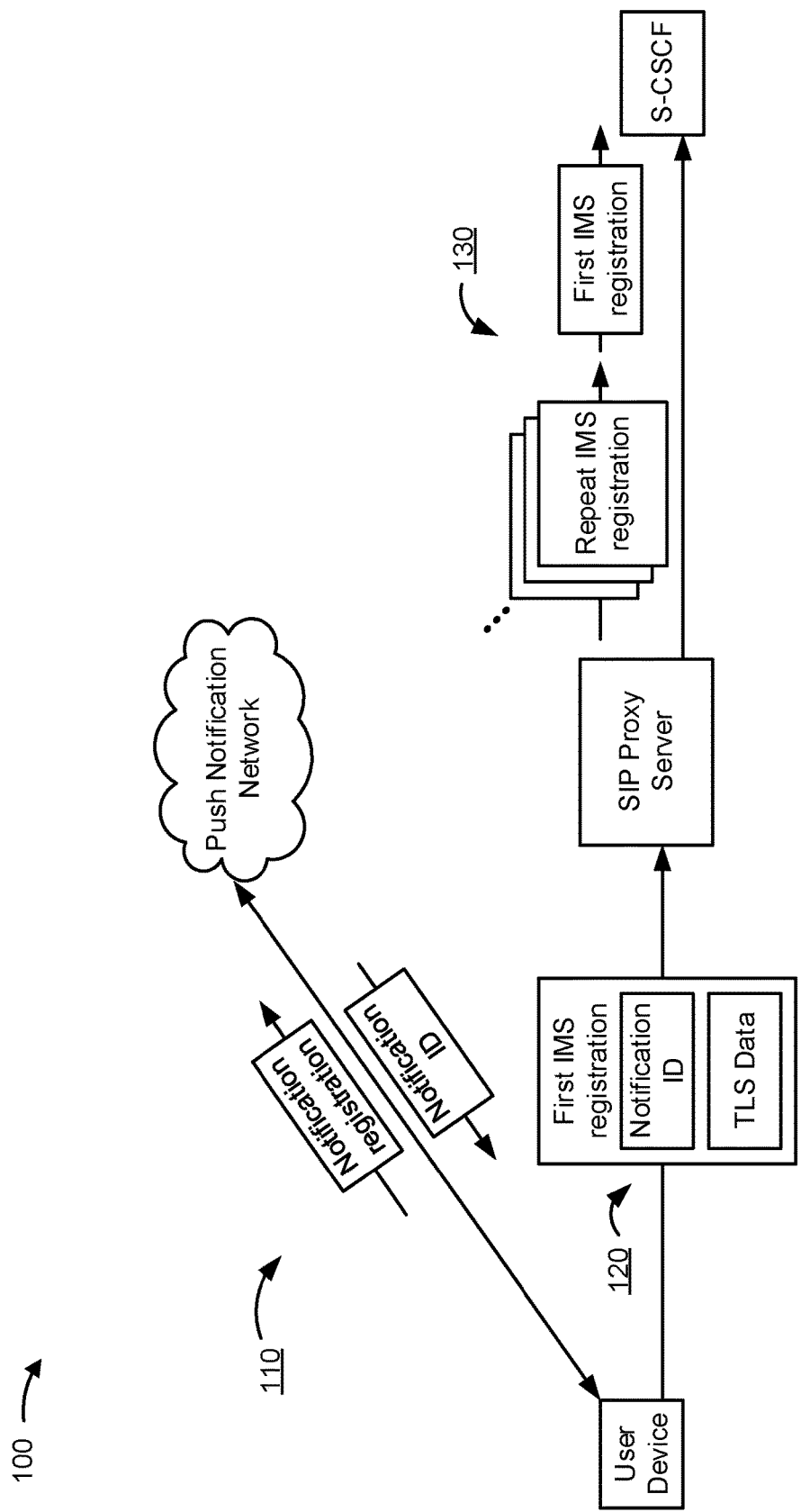
FIG. 1A is a diagram of an overview of a first portion of an example implementation described herein.

FIG. 1A is a diagram of an overview of a first portion of an example implementation 100 described herein. As shown in FIG. 1A, example implementation 100 includes a user device (e.g., a mobile phone or computer) that can include various applications that communicate via IMS (e.g., VoIP or video calling applications). Example implementation 100 further includes an SIP proxy server (e.g., a P-CSCF or SBC) to facilitate IMS registration and other communications with other devices operating in the IMS core, such as a serving-CSCF (S-CSCF), from which IMS invites can be provided. Example implementation 100 further includes a push notification network capable of providing push notifications to the user device. While examples herein refer to the receipt and handling of IMS invites, the IMS call management techniques can also apply to other types of IMS data, such as SMS messages, SIP messages, NOTIFY messages, and/or the like.

As shown in FIG. 1A, and by reference number 110, the user device provides notification registration data to the push notification network and receives a notification identifier from the push notification network. The notification identifier can be any type of identifier that identifies the user device and, in some implementations, an application operating on the device. In some implementations, an operating system and/or other application of the user device can cause the notification registration to be sent to the push notification network. In some implementations, the push notification network provides push notifications to various applications operating on the user device, such as an email application, messaging application, and/or the like. In this situation, the push notifications can be provided to the push notification network by other application servers, such as servers associated with the email application, messaging application, and/or other applications. In some implementations, the push notification network can be operated by an entity associated with an operating system that is used by the user device.

As further shown in FIG. 1A, and by reference number 120, the user device provides first IMS registration data to the SIP proxy server. The first IMS registration data includes the notification identifier received from the push notification network. In some implementations, transport layer security (TLS) data that can be used to establish a TLS session between the user device and SIP proxy server can be send with the first IMS registration data (e.g., separate from or included in the first IMS registration data). In some implementations, the first IMS registration data might have been sent by the user device based on an application of the user device, such as an application that uses IMS communications (e.g., VoIP application, video calling application, and/or the like).

As further shown in FIG. 1A, and by reference number 130, the SIP proxy server forwards the first IMS registration data to the IMS cloud via the S-CSCF and maintains the IMS connection that results from the first IMS registration data. In some implementations, the notification identifier, and/or the TLS data, is not included in the first IMS registration data or repeat IMS registration data. In some implementations, the IMS connection established as a result of the first IMS registration data being sent is maintained (e.g., by the SIP proxy server) by periodically providing repeat IMS registration data (e.g., registration refreshes) and TLS keep-alive data to the S-CSCF. In this way, while the SIP proxy server maintains the IMS connection with the IMS core on behalf of the user device, the user device can idle, sleep, or perform other actions designed to conserve battery life. For example, IMS applications operating on the user device no longer need to send registration refreshing data and transport layer security (TLS) keep-alive data, and the user device can drop the IMS connection.

Figure 1B:
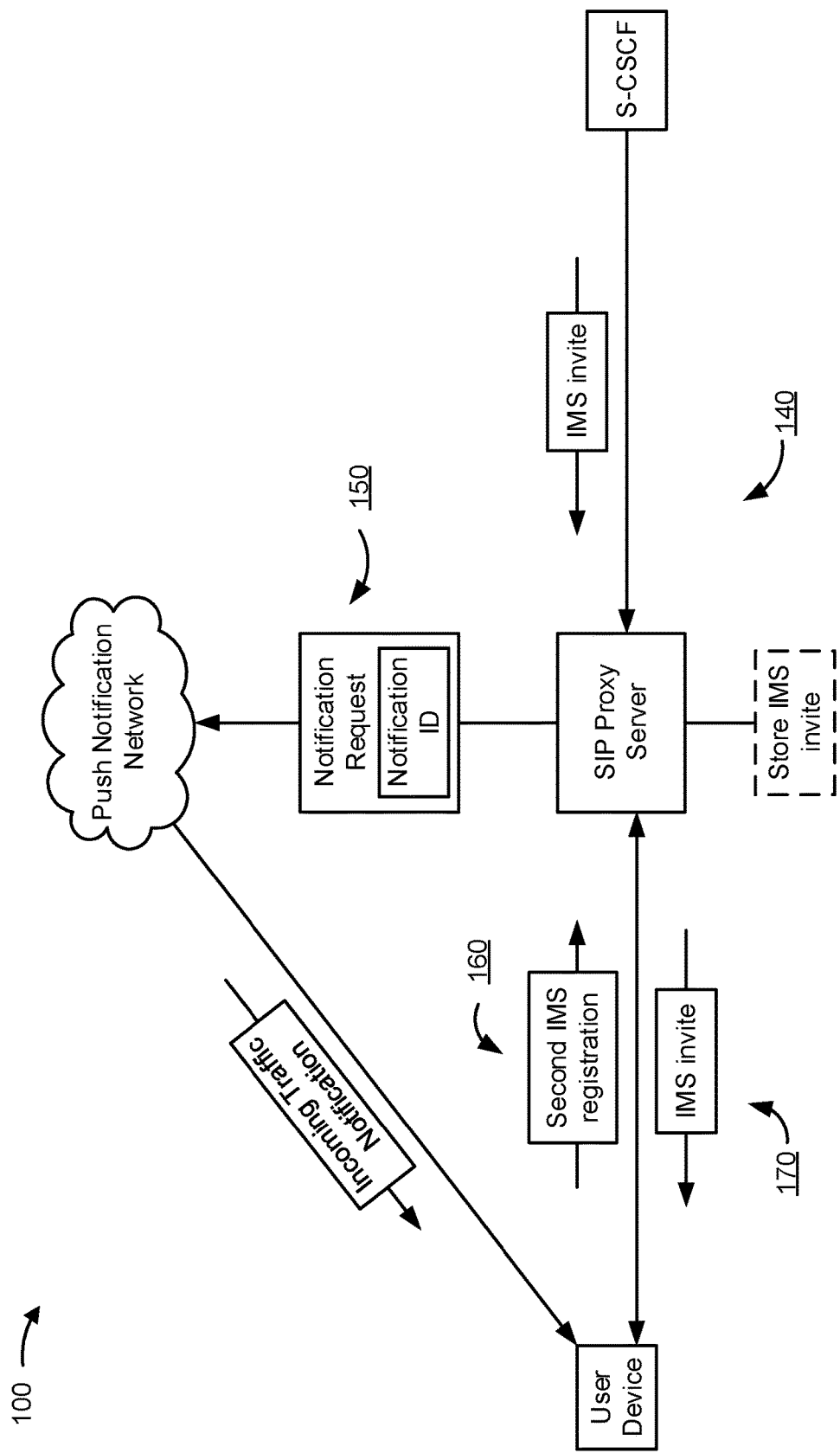
FIG. 1B is a diagram of an overview of a second portion of an example implementation described herein.

FIG. 1B is a diagram of an overview of a second portion of an example implementation 100 described herein. As shown in FIG. 1B, and by reference number 140, the SIP proxy server receives an IMS invite from the S-CSCF and the SIP proxy server holds the IMS invite. For example, the S-CSCF can provide the invite on behalf of an IMS application server that uses IMS to facilitate communications between user devices that use an IMS application associated with the IMS application server. In this situation, the S-CSCF, and the remainder of the IMS core network, perceive that the IMS connection with the user device is still alive because the SIP proxy server has been maintaining the IMS connection (e.g., as shown by 130 in FIG. 1A). The SIP proxy server can hold the IMS invite, for example, because it is aware that the user device dropped the IMS connection and is in sleep mode.

As further shown in FIG. 1B, and by reference number 150, the SIP proxy server provides a notification request to the push notification network, which provides an incoming traffic notification to the user device. The notification request includes the notification identifier that the user device provided in the first IMS registration data. In some implementations, the notification request is sent with the notification identifier to inform the push notification network that the SIP proxy server has permission to cause push notifications to be sent to the user device associated with the notification identifier. In some implementations, the notification request causes the push notification network to send a push notification (e.g., the incoming traffic notification, indicating incoming IMS traffic such as an Invite, MESSAGE, or NOTIFY) to the user device.

As further shown in FIG. 1B, and by reference number 160, the user device sends second IMS registration data to the SIP proxy server. For example, the user device can send the second IMS registration data based on the receipt of the incoming traffic notification. In this situation, the user device identifies, based on data included in the incoming traffic notification, the SIP proxy server to which to address the second registration data. In some implementations, the user device can send second IMS registration data that is not based on receipt of a notification (e.g., as in a situation where the user device makes an IMS call, rather than receives one).

As further shown in FIG. 1B, and by reference number 170, the SIP proxy server sends the IMS invite to the user device. For example, the SIP proxy server sends the IMS invite to the user device based on receipt of the second IMS registration. Providing the IMS invite allows the IMS application of the user device to receive the IMS invite (e.g., the VoIP call, video call, etc.)

In this way, the user device can forego activities (e.g., sending IMS registration refreshes and/or TLS keep-alive data) to maintain IMS connections that are not actively being used, conserving resources such as battery life, processing resources, and network bandwidth. In addition, an IMS call management device can facilitate significant data processing and network usage savings for a network provider by obviating the use of registration refresh and keep-alive data transmissions by potentially, hundreds, thousands, or millions of user devices.

As indicated above, FIGS. 1A and 1B are provided merely as examples. Other examples are possible and may differ from what was described with regard to FIGS. 1A and 1B.

Figure 2:
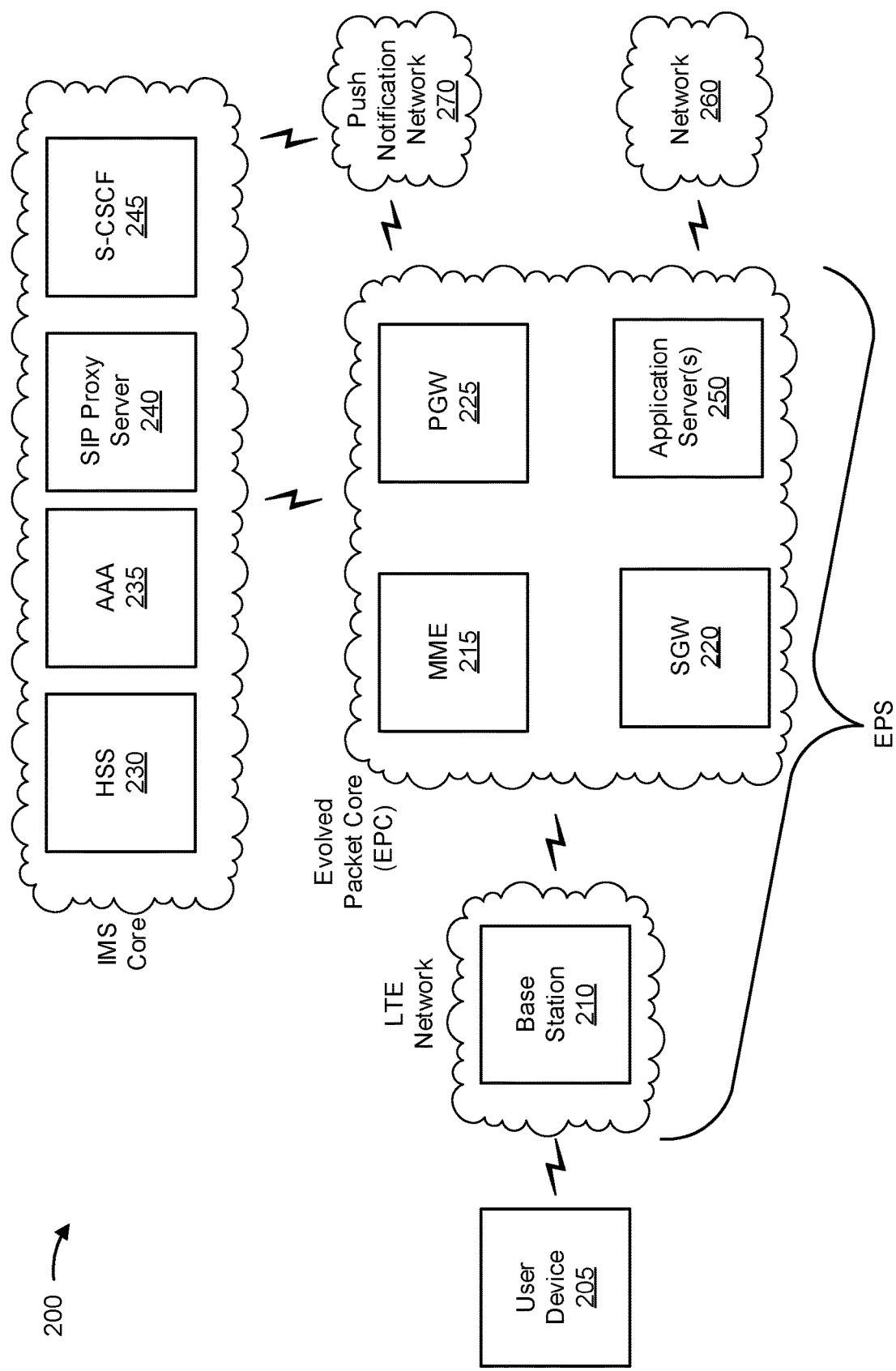
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a SIP proxy server 240; a serving CSCF (S-CSCF) 245; an application server 250; a network 260; and a push notification network 270. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, PGW 225, and/or application server 250 that enable user device 205 to communicate with network 260 and/or an Internet protocol (IP) multimedia subsystem (IMS) core. The IMS core may include HSS 230, AAA 235, SIP proxy server 240, and/or S-CSCF 245, and may manage device registration and authentication, session initiation, etc., associated with user devices 205. HSS 230, AAA 235, SIP proxy server 240, and/or S-CSCF 245 may reside in the EPC and/or the IMS core.

User device 205 includes one or more devices capable of communicating with base station 210 and/or a network (e.g., network 260). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 205 may send traffic to and/or receive traffic from network 260 (e.g., via base station 210, SGW 220, PGW 225, and/or application server 250).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 260 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 260 (e.g., via PGW 225) and/or other network devices associated with the EPC and/or the IMS core. SGW 220 may also receive traffic from network 260 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 260. Additionally, or alternatively, PGW 225 may receive traffic from network 260, and may send the traffic to user device 205 via SGW 220 and base station 210. PGW 225 may record data usage information (e.g., byte usage), and may provide the data usage information to AAA 235.

HSS 230 includes one or more devices, such as one or more server devices, capable of managing (e.g., receiving, generating, storing, processing, and/or providing) information associated with user device 205. For example, HSS 230 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 includes one or more devices, such as one or more server devices, that perform authentication, authorization, and/or accounting operations for communication sessions associated with user device 205. For example, AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

SIP proxy server 240 includes one or more devices, such as a server computer, router, or other computing device capable of implementing P-CSCF or (SBC) functionality. SIP proxy server 240 is capable of handling IMS packets as they are transmitted to and from user devices and the IMS core. In some implementations, SIP proxy server 240 can provide authentication and facilitate establishment of security sessions (e.g., TLS sessions) for IMS communications associated with user device 205. SIP proxy server 240 can also be capable of processing and storing data, such as IMS call data, data identifying user device 205, one or more push notification identifiers, and/or the like.

S-CSCF 245 includes one or more devices, such as a server computer, router, or other computing device capable of implementing S-CSCF functionality. In some implementations, S-SCSF includes or is included in an SIP proxy server, such as SIP proxy server 240. The S-SCSF provides session control for the IMS core and facilitates IMS registration of user device 205, which can include identifying the SIP proxy server 240 for IMS communications associated with user device 205. S-CSCF 245 can, in some implementations, facilitate communications between IMS application servers, such as application server 250, and user devices, such as user device 205 (e.g., by determining which IMS application server, or user device, particular IMS communications are to be sent).

Application server 250 includes one or more devices, such as a server computer, capable of providing IMS application services, such as voice calling services, messaging services, video calling services, and/or the like. Application server 250 can use network 260 to receive IMS data from, and provide IMS data to, a corresponding application operating on user device 205. For example, application server 250 can correspond to a VoIP application installed on user devices, such as user device 205. Application server 250 can receive an IMS call from one user device 205 and send the IMS call data to another user device 205 to facilitate the establishment of a VoIP call between user devices.

Network 260 includes one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Push notification network 270 includes a network capable of providing push notifications to user device 205. The push notification network 270 can include features similar to those of network 260 and can use network 260, alone or in combination with other similar networks, to deliver push notifications. Push notifications include data that can be sent by an application server, such as application server 250, to push notification network 270 and are addressed for one or more user devices, such as user device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
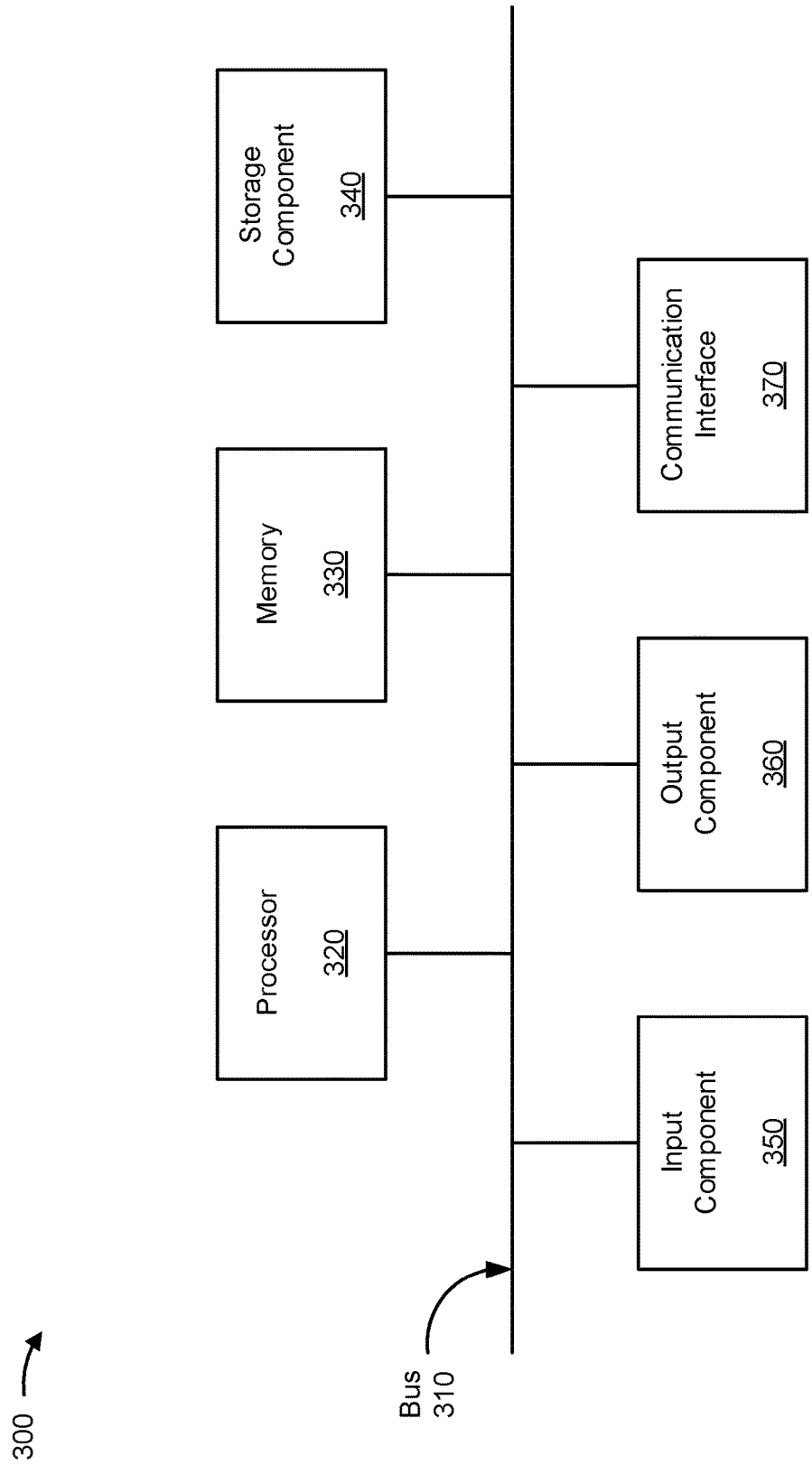
FIG. 3 is a diagram of example components of one or more devices of FIG. 2.

FIG. 3 is a diagram of example components of a device 300. Device 300 may correspond user device 205, base station 210, MME 215, SGW 220, PGW 225, HSS 230, AAA 235, SIP proxy server 240, S-CSCF 245, and/or application server 250. In some implementations user device 205, base station 210, MME 215, SGW 220, PGW 225, HSS 230, AAA 235, SIP proxy server 240, S-CSCF 245, and/or application server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
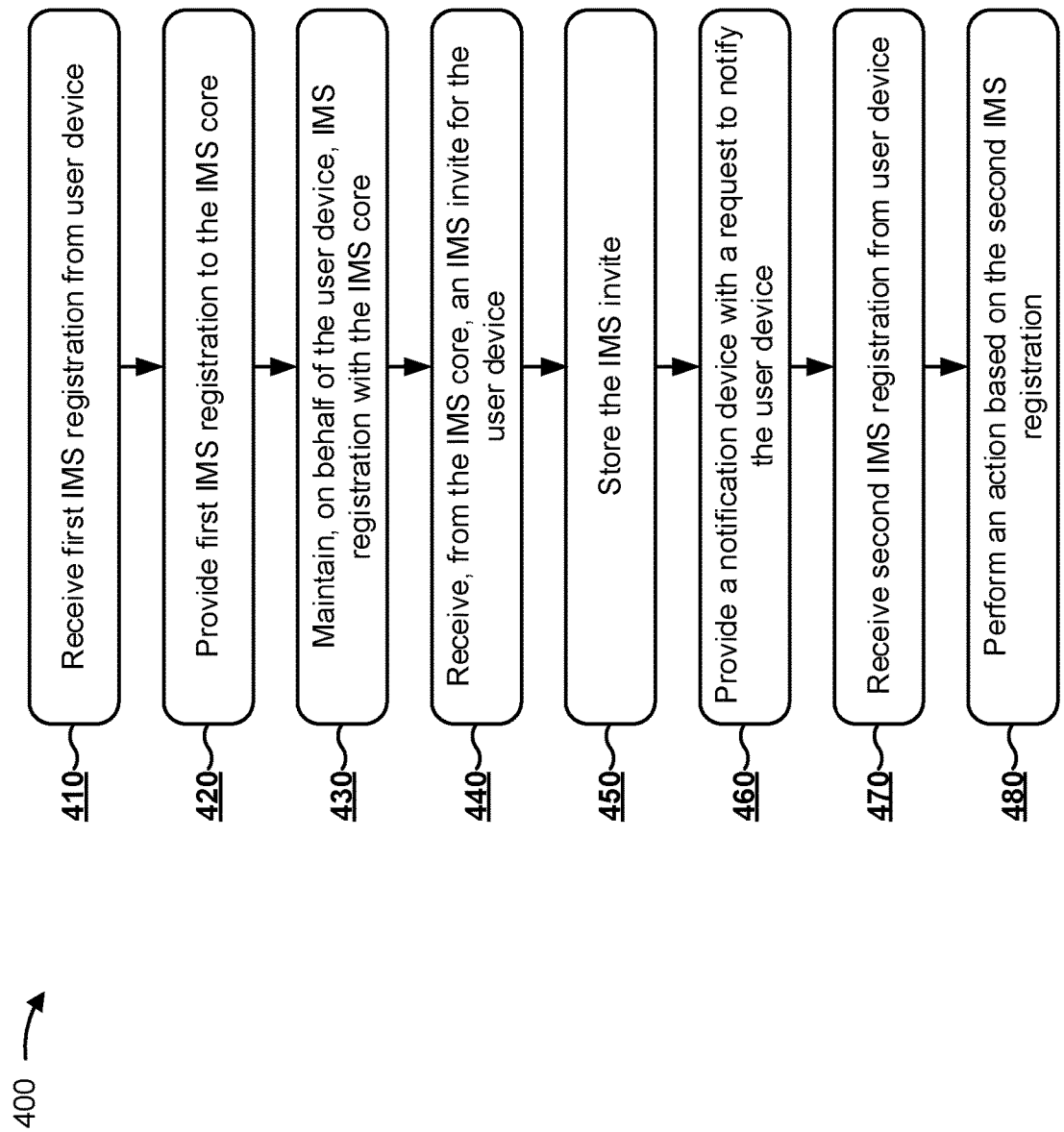
FIG. 4 is a flow chart of an example process for IMS connection management.

FIG. 4 is a flow chart of an example process 400 for IMS connection management. In some implementations, one or more process blocks of FIG. 4 may be performed by SIP proxy server 240. In some implementations, one or more process blocks of FIG. 4 may be performed by another device or a group of devices separate from or including SIP proxy server 240, such as user device 205, base station 210, MME 215, SGW 220, PGW 225, HSS 230, AAA 235, S-CSCF 245, and/or application server 250.

As shown in FIG. 4, process 400 can include receiving first IMS registration from user device (block 410). For example, SIP proxy server 240 can receive first IMS registration data from user device 205. The first IMS registration can be provided by user device 205 based on an IMS application operating on user device 205. In some implementations, the first IMS registration can include data for establishing an IMS connection (e.g., data identifying an IP address of user device 205, an international mobile subscriber identity (IMSI), a mobile station international subscriber directory number (MSISDN), an international mobile equipment identity (IMEI), an IMS application identifier, transport layer security (TLS) data, and/or the like). The first IMS registration data can also include a push notification identifier for user device 205 (e.g., an identifier provided to user device 205 by a push notification network or device).

In some implementations, an IMS application can be an application that uses IMS for communications with another device.

In some implementations, the push notification identifier provided by user device 205 was previously provided to user device 205 by push notification network 270. For example, the push notification identifier might have been provided by push notification network 270 based on request from user device 205 (e.g., a request initiated from an IMS application operating on user device 205).

In some implementations, the first IMS registration data can include data indicating that user device 205 will not maintain the IMS connection after the registration resulting from the first IMS registration data. For example, the first IMS registration data can include a flag, identifier, and/or the like, which indicates to SIP proxy server 240 that SIP proxy server 240 should maintain the connection on behalf of user device 205.

In this way, SIP proxy server 240 can receive the first IMS registration data from user device 205, which can enable SIP proxy server 240 to facilitate the establishment of an IMS connection with the IMS core and indicate to SIP proxy server 240 that SIP proxy server 240 should maintain the resulting IMS connection on behalf of user device 205.

As further shown in FIG. 4, process 400 can include providing first IMS registration to the IMS core (block 420). For example, SIP proxy server 240 can provide the first IMS registration data to one or more devices associated with the IMS core, such as S-CSCF 245 and/or application server(s) 250. As indicated above, the first IMS registration data includes data for establishing an IMS connection (e.g., between user device 205 and application server(s) 250). The resulting IMS connection can enable, for example, voice, video, and data communications between devices (e.g., between user device 205 and a different user device or application server(s) 250).

In some implementations, SIP proxy server 240 can remove, from the first IMS registration data, a push notification identifier and/or other data that was provided by user device 205 in a manner designed to enable SIP proxy server 240 to maintain the IMS connection on behalf of user device 205. In some implementations, SIP proxy server 240 can store the removed data and/or other IMS registration data that can be used to maintain the IMS connection.

In some implementations, a security session can also be established, as part of the IMS connection, in a manner designed to ensure secure IMS communications. For example, a TLS connection can be established as part of the IMS connection.

In this way, SIP proxy server 240 can provide the first IMS registration data to the IMS core, which can facilitate the establishment of an IMS connection between user device 205 and one or more other devices.

As further shown in FIG. 4, process 400 can include maintaining, on behalf of the user device, IMS registration with IMS core (block 430). For example, SIP proxy server 240 can maintain the IMS connection with the IMS core by sending periodic communications to devices associated with the IMS core, such as S-CSCF 245 and/or application server(s) 250. The periodic communications, such as TLS keep-alive messages and IMS refresh messages, can be provided by SIP proxy server 240 in a manner designed to ensure that the TLS session and/or IMS connection are not dropped by the IMS core. In some implementations, by maintaining the IMS connection, SIP proxy server 240 can make it appear, to the IMS core, that user device 205 is still awake and maintaining its IMS connection to the IMS core.

In some implementations, the amount of time between keep-alive messages can vary. For example, TLS requirements can cause SIP proxy server 240 to send keep-alive messages more frequently than IMS connection requirements. Keep-alive messages can be sent, for example, every 5 minutes, every two hours, once per day, or any other period of time that results in keeping the IMS connection active. In some implementations, a keep-alive message sent by SIP proxy server 240 can include data needed to keep all aspects of the IMS connection active, such as TLS data and/or any data provided to the IMS core in the first IMS registration data.

In some implementations, user device 205 can idle, sleep, or change to a power saving state while SIP proxy server 240 maintains the IMS connection. For example, user device 205 can enter a sleep state that includes dropping the TLS/IMS connection. By sleeping in this way, user device 205 can conserve battery life, conserve processing resources, and/or the like.

In this way, SIP proxy server 240 can maintain, on behalf of the user device, the IMS connection with the IMS core, enabling SIP proxy server 240 to receive IMS invites addressed to user device 205 even when user device 205 has dropped the IMS connection.

As further shown in FIG. 4, process 400 can include receiving, from IMS core, an IMS invite for the user device (block 440). For example, SIP proxy server 240 can receive, from S-CSCF 245, an IMS invite addressed to user device 205. The IMS invite can include data identifying user device 205 (e.g., an IP address, IMSI, MSISDN, IMEI, and/or the like) and the IMS application for which the IMS invite is sent. SIP proxy server 240 can receive the IMS invite based on the IMS connection that SIP proxy server 240 maintained on behalf of user device 205.

By way of example, the IMS invite can be for a VoIP application. In some implementations, SIP proxy server 240 can receive the IMS invite from the IMS core based on an IMS application server receiving IMS data from a different user device (e.g., a user trying to establish a VoIP call with user device 205).

In this way, SIP proxy server 240 can receive, from the IMS core, an IMS invite addressed to user device 205. Receiving the IMS invite enables SIP proxy server 240 to handle the IMS invite for user device 205, despite user device 205 having dropped the IMS connection.

As further shown in FIG. 4, process 400 can include storing the IMS invite (block 450). For example, SIP proxy server 240 can store the IMS invite (e.g., rather than forwarding it to user device 205 or responding to S-CSCF 245 with data indicating that user device 205 is unavailable).

In some implementations, SIP proxy server 240 can (e.g., prior to storing the IMS invite) attempt to deliver the IMS invite to user device 205. In a situation where user device 205 is asleep and/or has dropped the IMS connection, SIP proxy server 240 might be unable to deliver the IMS invite. In some implementations, SIP proxy server 240 can forego an attempt to deliver the IMS invite to user device 205 (e.g., in a situation where user device 205 previously notified SIP proxy server 240 that user device 205 was dropping the IMS connection). In some implementations, while SIP proxy server 240 holds the IMS invite due to the unavailability of user device 205, SIP proxy server 240 can forego notifying the IMS core (e.g., via S-CSCF 245) that user device 205 is unavailable.

In this way, SIP proxy server 240 can hold the IMS invite, enabling SIP proxy server 240 to attempt to notify user device 205 of the waiting IMS invite via push notification network 270.

As further shown in FIG. 4, process 400 can include providing a notification device with a request to notify the user device (block 460). For example, SIP proxy server 240 can send a notification request to a push notification device included in push notification network 270. In some implementations, the notification request can include data identifying user device 205, such as the notification identifier that user device 205 included in the first IMS registration data that was provided to SIP proxy server 240. The notification request can be sent based on receipt of the IMS invite from the IMS core.

In some implementations, the push notification network 270 to which SIP proxy server 240 sends the notification request can be based on data provided by user device 205. For example, push notification network 270 can be associated with an operating system of user device 205, and SIP proxy server 240 can determine which push notification network 270, or device operating on push notification network 270, to send the notification request to. In some implementations, the data identifying push notification network 270 can be provided by user device 205 (e.g., in the first IMS registration data) and/or determined by SIP proxy server 240 (e.g., based on identifying the operating system of user device 205 from data included in the first IMS registration data).

In some implementations, the notification request can include data identifying SIP proxy server 240 (e.g., in a manner designed to enable the recipient of a push notification to be capable of communicating with SIP proxy server). For example, the notification request can include the IP address and port number for SIP proxy server 240. In some implementations, the notification request can include data associated with the IMS invite. For example, the notification request can include data identifying the IMS application, a sender of the IMS invite, content included in the IMS invite, and/or the like.

In this way, SIP proxy server 240 can provide a notification device with a request to notify the user device, enabling push notification network 270 to send a push notification to user device 205 based on the notification request. The push notification can, in some implementations, include data that causes user device 205 to re-register with SIP proxy server 240 (e.g., in a manner designed to re-establish the IMS connection and receive the IMS invite).

As further shown in FIG. 4, process 400 can include receiving second IMS registration from user device (block 470). For example, SIP proxy server 240 can receive the second IMS registration from user device 205. In some implementations, user device 205 can send the second IMS registration data in a manner similar to that of the first IMS registration data (e.g., caused by an application operating on user device 205). The second IMS registration data can include data similar to that included in the first IMS registration data, such as user device 205 identifiers and TLS information for establishing an IMS connection using SIP proxy server 240.

As indicated above, in some implementations user device 205 sends the second IMS registration data based on receiving a notification from push notification network 270. For example, the notification can be received by an IMS application on user device 205, and the IMS application can cause the second IMS registration data to be sent (e.g., based on user interaction with the push notification or automatically by the IMS app).

In some implementations, the second IMS registration data can include a flag. In this situation, the flag can indicate to SIP proxy server 240 that it was sent based on the push notification.

In this way, SIP proxy server 240 can receive the second IMS registration from user device 205, enabling SIP proxy server 240 to perform a variety of actions, such as establish a second IMS connection, provide the IMS invite to user device 205, notify the IMS core of the second IMS connection, and/or the like.

As further shown in FIG. 4, process 400 can include performing an action based on the second IMS registration (block 480). For example, SIP proxy server 240 can perform a variety of actions based on the second IMS registration. The actions can include, for example, actions associated with SIP proxy server 240, user device 205, the IMS core (e.g., S-CSCF 245 and/or application server(s) 250), and/or push notification network 270.

In some implementations, SIP proxy server 240 can perform an action to provide user device 205 with an IMS invite. For example, SIP proxy server 240 can send the stored IMS invite to user device 205. In some situations, SIP proxy server 240 can store multiple IMS invites for user device 205, and SIP proxy server 240 can perform an action to determine which IMS invite is to be sent to user device 205. For example, a priority system (e.g., based on time IMS invite was received, IMS application priority, and/or the like) can be used by SIP proxy server 240 to determine which IMS invite to send to user device 205 and which IMS invite should continue to be stored and/or dropped.

In some implementations, SIP proxy server 240 can perform an action to establish a temporary IMS connection. In this situation, after the conclusion of the IMS call associated with the IMS invite, user device 205 can re-register with SIP proxy server 240 to establish a standard IMS connection or another IMS connection that will be maintained by SIP proxy server 240.

In some implementations, SIP proxy server 240 can re-authenticate user device 205. For example user device 205 might have a different IP address and SIP proxy server can re-authenticate user device 205 in a manner designed to ensure secure IMS communications. Additionally, or alternatively, SIP proxy server 240 can request updated user data from user device 205. For example, some user data, such as an IP address, might have changed, and SIP proxy server 240 can request an update in a manner designed to ensure that SIP proxy server 240 and IMS core has updated user data. In some implementations, SIP proxy server 240 can perform an action to notify the IMS core. In this way, SIP proxy server 240 can update the IMS core with updated user data regarding user device 205 (e.g., an IP address change). In some implementations, SIP proxy server 240 can perform an action to send another push notification request to push notification network 270 (e.g., in the event of no response from user device 205 or an error).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
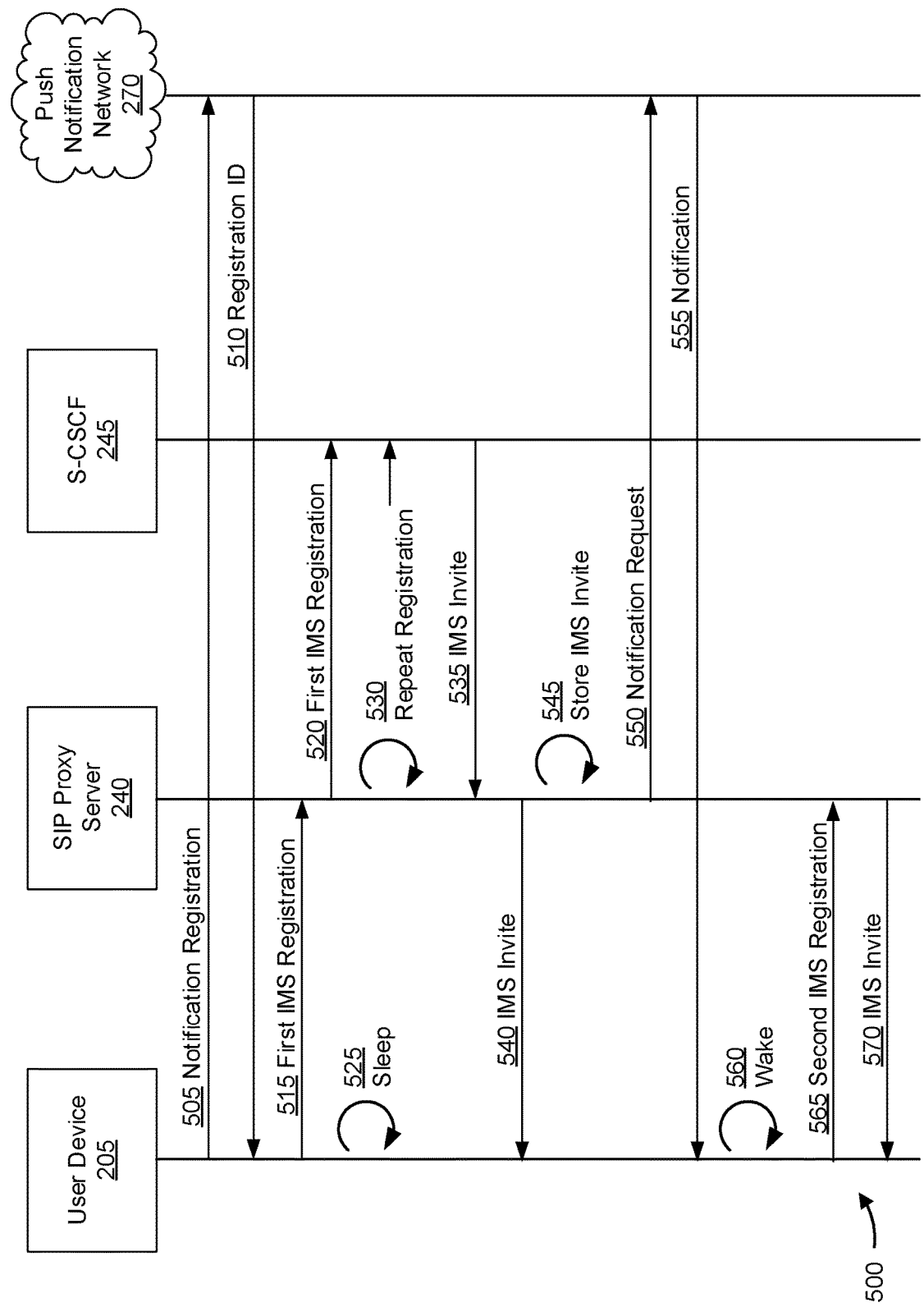
FIG. 5 is a call flow relating to the example process shown in FIG. 4.

FIG. 5 is a call flow diagram of an example call flow 500 for IMS connection management. As shown in FIG. 5, and by reference number 505, user device 205 sends a notification registration to push notification network 270. For example, operating system software and/or another application operating on user device 205 can send data to a corresponding push notification network 270, the data indicating that user device 205 will receive push notifications from push notification network 270 that are sent on behalf of a third party entity and/or an entity associated with push notification network 270.

As shown by reference number 510, push notification network 270 sends a registration identifier to user device 205. For example, the registration identifier can include an identifier, which user device 205 can provide to third party entities in a manner designed to allow the third party entities to send user device 205 push notifications via push notification network 270.

As shown by reference number 515, user device 205 sends a first IMS registration to SIP proxy server 240. For example, a VoIP application operating on user device 205 can cause user device 205 to provide first IMS registration data to SIP proxy server 240. The first IMS registration data can include data for establishing an IMS connection (e.g., data identifying an IP address of user device 205, an IMSI, an MSISDN, an IMEI, an IMS application identifier, TLS data, and/or the like) and can also include the registration identifier provided by push notification network 270.

As shown by reference number 520, SIP proxy server 240 sends the first IMS registration to S-CSCF 245. For example, SIP proxy server 240 can send first IMS registration data upon removing a push notification identifier and/or other data that was provided by user device 205 in a manner designed to enable SIP proxy server 240 to maintain the IMS connection on behalf of user device 205.

As shown by reference number 525, user device 205 can sleep while SIP proxy server 240 maintains the IMS connection. For example, user device 205 can enter a sleep state that includes dropping the TLS/IMS connection. As shown by reference number 530, SIP proxy server 240 maintains the IMS connection. For example, SIP proxy server 240 maintains the IMS connection by periodically providing repeat IMS registration data (e.g., IMS refresh data and/or TLS keep-alive data) to S-CSCF 245.

As shown by reference number 535, S-CSCF 245 sends an IMS invite to proxy server 240. For example, the IMS invite can include data identifying user device 205 and the IMS application for which the IMS invite is sent, and SIP proxy server 240 can receive the IMS invite based on the IMS connection that SIP proxy server 240 maintained on behalf of user device 205. As shown by reference number 540, proxy server 240 can send the IMS invite to user device 205. For example, SIP proxy server 240 can attempt to deliver the IMS invite to user device 205 prior to storing the IMS invite.

As shown by reference number 545, SIP proxy server 240 holds the IMS invite. For example, SIP proxy server 240 can forego an attempt to deliver the IMS invite to user device 205 (e.g., in a situation where user device 205 previously notified SIP proxy server 240 that user device 205 was dropping the IMS connection).

As shown by reference number 550, SIP proxy server 240 sends a notification request to push notification network 270. For example, the notification request can include data identifying user device 205, such as the notification identifier that user device 205 included in the first IMS registration data that was provided to SIP proxy server 240.

As shown by reference number 555, push notification network 270 sends a notification to user device 205. For example, the notification can be received by an IMS app on user device 205. As shown by reference number 560, user device 205 can wake upon receiving the notification from push network 270. As shown by reference number 565, user device sends a second IMS registration to SIP proxy server 240. For example, an IMS application operating on user device 205 can cause the second IMS registration data to be sent.

As shown by reference number 570, SIP proxy server 240 sends an IMS invite to user device 205. For example, SIP proxy server 240 can send the IMS invite based on receipt of the second IMS registration, allowing an IMS application operating on the user device to receive the IMS invite (e.g., the VoIP call, video call, etc.).

As indicated above, FIG. 5 is provided as merely an example. Other examples are possible and can differ from what was described with regard to FIG. 5. For example, the order in which the steps of call flow 500 occur can differ and/or additional or fewer devices (e.g., devices that are described with respect to FIG. 2) can be used at various points during the call flow.

Some implementations, described herein, provide a device that is capable of maintaining an IMS connection on behalf of a user device that has dropped the IMS connection and storing an IMS invite addressed to the user device until the user device re-registers. Re-registration by the user device can be based on the user device receiving a notification that the device requested be sent to the user device from a third party push notification network. In this way, the user device can drop IMS connections that are not actively being used, conserving resources such as battery life and data. In addition, the device can facilitate significant data processing and network usage savings for a network provider by obviating the use of keep-alive data transmissions by potentially, hundreds, thousands, or millions of user devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive first internet protocol multimedia subsystem (IMS) data from a user device;
   provide first IMS registration data to an IMS device,
      the first IMS registration data including data identifying the user device, and
      the first IMS registration data being associated with an IMS connection between the user device and, via the device, the IMS device;
   receive an indication that the user device has dropped a first portion of the IMS connection,
      the first portion being between the user device and the device;
   maintain, after receiving the indication, a second portion of the IMS connection,
      the second portion being between the device and the IMS device, and
      wherein the one or more processors, when maintaining the second portion of the IMS connection, are to:
         periodically provide transport layer security (TLS) keep-alive data to the IMS device on behalf of the user device;
   receive, from the IMS device, an IMS invite addressed to the user device;
   store the IMS invite;
   provide, to a push notification device, a push notification request that specifies the user device;
   receive, from the user device, second IMS registration data; and
   perform an action based on the second IMS registration data.

2. The device of claim 1, where the one or more processors are further to:
   identify a flag included in the first IMS registration data, the flag indicating, to the device, that the device is to maintain the second portion of the IMS connection.

3. The device of claim 1, where the one or more processors are further to:
   obtain, from the first IMS registration data, a push notification identifier that identifies the user device to the push notification device.

4. The device of claim 3, where the one or more processors are further to:
   include, in the push notification request, the push notification identifier.

5. The device of claim 1, where the one or more processors are further to:
   include, in the push notification request, data identifying the device.

6. The device of claim 1, where the one or more processors are further to:
   include, in the push notification request, data identifying an IMS application associated with the IMS invite.

7. The device of claim 1, where the one or more processors are further to:
   include, in the push notification request, data identifying content included in the IMS invite.

8. The device of claim 1, where the one or more processors are further to:
   include, in the push notification request, instructions to provide a push notification to the user device.

9. The device of claim 1, where the push notification device is included in a push notification network associated with the user device.

10. The device of claim 9, where the one or more processors are further to:
    identify, based on data received from the user device, the push notification network to which the push notification request is to be provided.

11. A non-transitory computer-readable medium storing instructions, the instructions comprising:
    one or more instructions that, when executed by one or more processors of a device, cause the one or more processors to:
    receive first internet protocol multimedia subsystem (IMS) data from a user device;
    provide first IMS registration data to an IMS device,
       the first IMS registration data including data identifying the user device, and
       the first IMS registration data being associated with an IMS connection between the user device and, via the device, the IMS device;
    receive an indication that the user device has dropped a first portion of the IMS connection,
       the first portion being between the user device and the device;
    maintain, after receiving the indication, a second portion of the IMS connection,
       the second portion being between the device and the IMS device, and
       wherein the one or more instructions, that cause the one or more processors to maintain the second portion of the IMS connection, cause the one or more processors to:
          periodically provide transport layer security (TLS) keep-alive data to the IMS device on behalf of the user device;
    receive, from the IMS device, an IMS invite addressed to the user device;
    store the IMS invite;
    provide, to a push notification device, a push notification request that specifies the user device;

receive, from the user device, second IMS registration data; and perform an action based on the second IMS registration data.

12. The non-transitory computer-readable medium of claim 11, where the one or more instructions, that cause the one or more processors to maintain the second portion of the IMS connection, cause the one or more processors to:

periodically provide IMS registration data to the IMS device on behalf of the user device.

13. A method, comprising:

receiving, by a device, first internet protocol multimedia subsystem (IMS) data from a user device;

providing, by the device, first IMS registration data to an IMS device, the first IMS registration data including data identifying the user device, and the first IMS registration data being associated with an IMS connection between the user device and, via the device, the IMS device;

receiving, by the device, an indication that the user device has dropped a first portion of the IMS connection, the first portion being between the user device and the device;

maintaining, by the device and after receiving the indication, a second portion of the IMS connection, the second portion being between the device and the IMS device, and wherein maintaining the second portion of the IMS connection comprises:

periodically providing transport layer security (TLS) keep-alive data to the IMS device on behalf of the user device;

receiving, by the device and from the IMS device, an IMS invite addressed to the user device;

storing, by the device, the IMS invite;

providing, by the device and to a push notification device, a push notification request that specifies the user device;

receiving, by the device and from the user device, second IMS registration data; and performing, by the device, an action based on the second IMS registration data.

14. The method of claim 13, where performing the action based on the second IMS registration data comprises:

forwarding the IMS invite to the user device.

15. The method of claim 13, where performing the action based on the second IMS registration data comprises:

storing the second IMS registration at the device;

receiving, from the user device, third IMS registration data;

discarding the second IMS registration data; and providing the third IMS registration data to the IMS device.

16. The method of claim 13, where performing the action based on the second IMS registration data comprises:

requesting updated user device data from the user device;

receiving updated user device data from the user device; and providing the updated user device data to the IMS device.

17. The method of claim 13, where performing the action based on the second IMS registration data comprises:

providing the user device with a request for third IMS registration data.

18. The method of claim 17, further comprising:

providing the user device with the IMS invite;

receiving, from the user device and after an IMS call that corresponds to the IMS invite concludes, third IMS registration data; and providing the third IMS registration data to the IMS device.

19. The non-transitory computer-readable medium of claim 11, where the one or more instructions, that cause the one or more processors to perform the action based on the second IMS registration data, cause the one or more processors to:

receive updated user device data from the user device; and provide the updated user device data to the IMS device.

20. The non-transitory computer-readable medium of claim 11, where the one or more instructions, when executed by the one or more processors, further cause the one or more processors to:

provide the user device with the IMS invite;

receive, from the user device and after an IMS call that corresponds to the IMS invite concludes, third IMS registration data; and provide the third IMS registration data to the IMS device.

* * * * *